(12) United States Patent
Manson

(10) Patent No.: US 9,558,075 B2
(45) Date of Patent: Jan. 31, 2017

(54) SYNTHETIC FULL BACKUP GENERATION

(75) Inventor: Carl R. Manson, Eden Prairie, MN (US)

(73) Assignee: Veritas Technologies LLC, Mountain View, CA (US)

( * ) Notice: Subject to any disclaimer, the term of this patent is extended or adjusted under 35 U.S.C. 154(b) by 1179 days.

(21) Appl. No.: 12/624,526

(22) Filed: Nov. 24, 2009

(65) Prior Publication Data

US 2011/0125714 A1    May 26, 2011

(51) Int. Cl.
  *G06F 17/30*   (2006.01)
  *G06F 11/14*   (2006.01)
(52) U.S. Cl.
  CPC ........ *G06F 11/1458* (2013.01); *G06F 11/1448* (2013.01); *G06F 11/1464* (2013.01)
(58) Field of Classification Search
  USPC .............. 707/204, 636, 609, 640, 661, 687, 693,707/705
  See application file for complete search history.

(56) References Cited

U.S. PATENT DOCUMENTS

| | | | |
|---|---|---|---|
| 5,212,784 A * | 5/1993 | Sparks | ........................ 714/6.12 |
| 7,266,655 B1 | 9/2007 | Escabi, II et al. | |
| 7,725,438 B1 | 5/2010 | Shah et al. | |
| 7,756,833 B2 | 7/2010 | van Ingen et al. | |
| 7,949,635 B1 * | 5/2011 | Korshunov et al. | .......... 707/636 |
| 2009/0248762 A1 * | 10/2009 | Prahlad et al. | ............... 707/204 |
| 2009/0307286 A1 | 12/2009 | Laffin | |
| 2010/0274763 A1 | 10/2010 | van Ingen et al. | |

OTHER PUBLICATIONS

"TeraMerge® Enables Multiple Level Synthetic Backup Consolidation for the Full Version of the True incremental Backup System®"; Teradactyl LLC; 2007; 4 pages.
"Partial Cumulative Incremental Backups Offer Unique Advantages to Customers"; Teradactyl LLC; 2007; 4 pages.
"TeraMerge® Enables Single Level Synthetic Backup Consolidation for the Lite Version of the True incremental Backup System®"; Teradactyl LLC; 2007; 6 pages.

* cited by examiner

*Primary Examiner* — Sana Al Hashemi
(74) *Attorney, Agent, or Firm* — Meyertons Hood Kivlin Kowert & Goetzel. P.C.; Jeffrey C. Hood

(57) ABSTRACT

System and method for generating a synthetic full backup. A request to perform an incremental backup may be received at a target computer. The incremental backup may be performed on the target computer in response to the request. The target computer may maintain information identifying files that are encountered in the incremental backup. The information may be configured to be used to construct a synthetic full backup. A request to perform a synthetic full backup may be received. The information may be requested. The synthetic full backup may be constructed using the information from the target computer. A synthetic full backup index may be constructed for the synthetic full backup using records from old indexes for each file in the synthetic full backup. The synthetic full backup may be transferred to a backup image. The synthetic full backup index may be stored.

20 Claims, 5 Drawing Sheets

SYNTHETIC FULL BACKUP GENERATION

BACKGROUND

1. Technical Field

This disclosure relates generally to data backup systems, and, more specifically, to a distributed system and method for generating a synthetic full backup.

2. Description of the Related Art

Computer systems, and their components, are subject to various types of failures which may result in the loss of data. For example, a storage device used in or by the computer system may experience a failure (e.g. mechanical, electrical, magnetic, etc.) which may make any data stored on that storage device unreadable. Erroneous software or hardware operation may corrupt the data stored on a storage device, destroying the data stored on an otherwise properly functioning storage device. Any component in the storage chain between (and including) the storage device and the computer system may experience failure (e.g. the storage device, connectors (e.g. cables) between the storage device and other circuitry, the network between the storage device and the accessing computer system (in some cases), etc.).

To mitigate the risk of losing data, computer systems typically replicate (or make backup copies of) data stored on various storage devices. A variety of techniques are available for backing up data. For example, for a given set of data (such as the data on a particular computer system, e.g., one or more file systems and/or volumes) a full backup backs up the entire data set. This leads to the backup data set typically being stored in a single location, which simplifies restore operations. However, in systems with relatively few changes compared to the overall number of files, performing full backups can be relatively resource (e.g., time and network bandwidth) inefficient. In addition, the storage cost of maintaining multiple full backups is significant.

In order to reduce overall storage requirements for data backup, incremental backups are sometimes employed. An incremental backup typically only backs up files that have changed since the last backup (e.g., full or incremental) was taken. In systems with relatively few changes compared to the overall number of files, the time needed to take an incremental backup is typically substantially less than that needed for a full backup. However, performing a series of incremental backups can lead to data being stored in disparate locations, which can cause management of this data to become more complicated over time. Restores also often take longer in such situations, as information must be collected from different locations and longer and longer series of incremental backups. Because of this, it is desirable to periodically have full backups. However, since full backups typically consume significant network bandwidth and cut into the time available to perform incremental backups, improvements in backup systems that address the existing problems with incremental and full backups are desirable.

SUMMARY

Embodiments are presented of a system and method for generating a synthetic full backup.

One set of embodiments includes a distributed method for generating a synthetic full backup. The method may include tracking and storing information for use in constructing the synthetic full backup on the computer system (e.g., a client computer system) being backed up, and/or using a different computer system (e.g., a server computer system) to construct the synthetic full backup using the information stored by the computer system being backed up. By delegating the process of tracking and storing the information for use in constructing a synthetic full backup to the machine(s) being backed up (e.g., as opposed to centralized servers), workload can potentially be more evenly distributed throughout a network.

The method may include using a computer to perform the following steps. A request to perform an incremental backup may be received at a target computer. The incremental backup may be performed on the target computer in response to the request. The target computer may maintain information identifying the files that are encountered in the incremental backup. The information may be configured to be used to construct a synthetic full backup.

A request to perform a synthetic full backup may be received. The information may be requested. The synthetic full backup may be constructed using the information from the target computer. A synthetic full backup index for the synthetic full backup may be constructed using records from old indexes for each file in the synthetic full backup. The synthetic full backup may be transferred to a backup image. The synthetic full backup index may be stored.

According to some embodiments, constructing the synthetic full backup may include combining a plurality of incremental and/or full backup images to create the synthetic full backup.

According to some embodiments, maintaining the information identifying the files that are encountered in the incremental backup may include storing file identifiers into a data structure on the target computer corresponding to files that are encountered in the incremental backup. The plurality of incremental and/or full backup images used to construct the synthetic full backup may thus include latest backups for the files indicated by the file identifiers.

According to some embodiments, storing the file identifiers may include storing a file comprising a stack of file identifiers for files that are encountered in the incremental backup.

According to some embodiments, the method may further include creating a separate directory for each file system and each volume that is encountered in the incremental backup at the target computer. The file identifiers stored for files that are encountered in the incremental backup may thus be stored in a directory according to the file system or volume in which the corresponding files are located.

According to some embodiments, each file identifier may uniquely identify a file within a file system or volume.

One set of embodiments includes a computer readable storage medium. The computer readable storage medium may include program instructions for storing information for use in generating a synthetic full backup. The program instructions may be executable by a computer system to perform the following steps.

A request to perform an incremental backup may be received at a target computer. The incremental backup may be performed on the target computer in response to the request. File identifiers may be stored for files that are encountered in the incremental backup. The file identifiers may be stored in a data structure on the target computer. The file identifiers may be configured to be used to construct a synthetic full backup According to some embodiments, the program instructions to store information for use in generating a synthetic full backup may be executable to perform the following steps. A request for file information for use in constructing a synthetic full backup may be received. The file identifiers may be conveyed in response to the request. The file identifiers may be used to construct a synthetic full backup.

According to some embodiments, the synthetic full backup may be constructed by combining a plurality of incremental and/or full backup images to create the synthetic full backup.

According to some embodiments, the plurality of incremental and/or full backup images used to construct the synthetic full backup may include latest backups for the files indicated by the file identifiers.

According to some embodiments, the program instructions for storing the file identifiers may be executable to store a file comprising a stack of file identifiers for files that are encountered in the incremental backup According to some embodiments, the program instructions may be further executable to create a separate directory for each file system and each volume that is encountered in the incremental backup at the target computer. The file identifiers stored for files that are encountered in the incremental backup may thus be stored in a directory according to the file system or volume in which the corresponding files are located.

According to some embodiments, each file identifier may uniquely identify a file within a file system or volume.

A further set of embodiments also includes a computer readable storage medium. The computer readable storage medium may include program instructions for generating a synthetic full backup. The program instructions may be executable by a computer system to perform the following steps.

A request to perform a synthetic full backup of a target computer may be received. File information may be requested from the target computer. The file information may include file identifiers stored in a data structure on the target computer. The file identifiers may be a representation of a full backup. The file information may be received from the target computer. The synthetic full backup may be constructed. The synthetic full backup may include latest backups for the files indicated by the file identifiers. A synthetic full backup index for the synthetic full backup may be constructed using records from old indexes for each file indicated by the file identifiers. the synthetic full backup may be transferred to a backup image. The synthetic full backup index may be stored.

According to some embodiments, in constructing the synthetic full backup, the program instructions may be further executable to combine a plurality of incremental and/or full backup images to create the synthetic full backup.

According to some embodiments, the plurality of incremental and/or full backup images used to construct the synthetic full backup may include latest backups for the files indicated by the file identifiers.

According to some embodiments, the file identifiers may be stored at the target computer in a file comprising a stack of file identifiers for files that are encountered in the incremental backup.

According to some embodiments, a separate directory may be stored at the target computer for each file system and each volume that is encountered in the incremental backup. The file identifiers stored for files that are encountered in the incremental backup may thus be stored in a directory according to the file system or volume in which the corresponding files are located.

According to some embodiments each file identifier may uniquely identify a file within a file system or volume.

Figure 1:
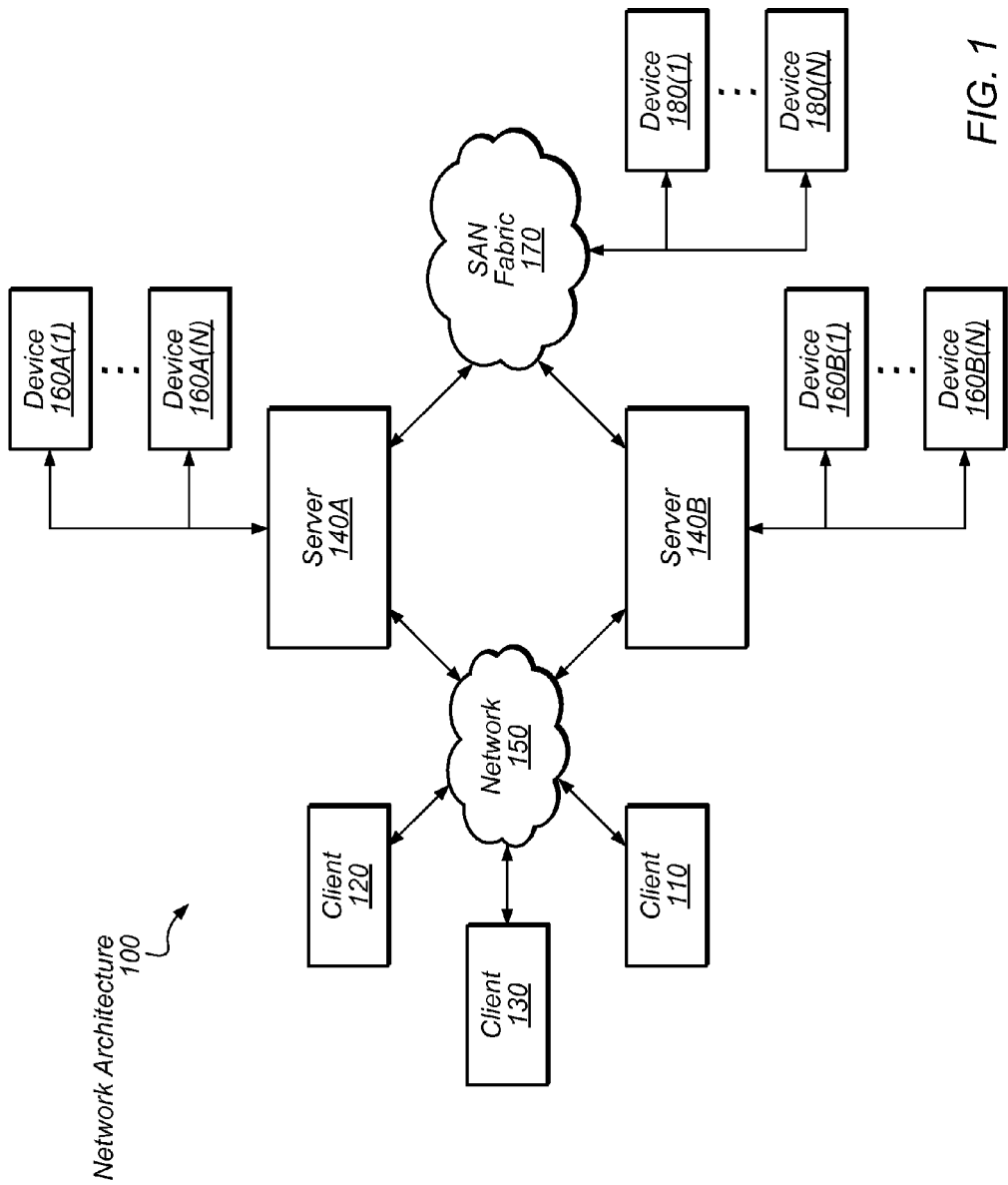
FIG. 1 is a block diagram illustrating a network architecture according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Computer System." This term has its ordinary and accepted meaning in the art, and includes one or more computing devices operating together and any software stored thereon. A computing device includes one or more processor units and a memory subsystem. A memory subsystem may store program instructions executable by the one or more processor units.

"Client system." This term has its ordinary and accepted meaning in the art, which includes a computer system that requests services, data, etc. from a server system.

Figure 2:
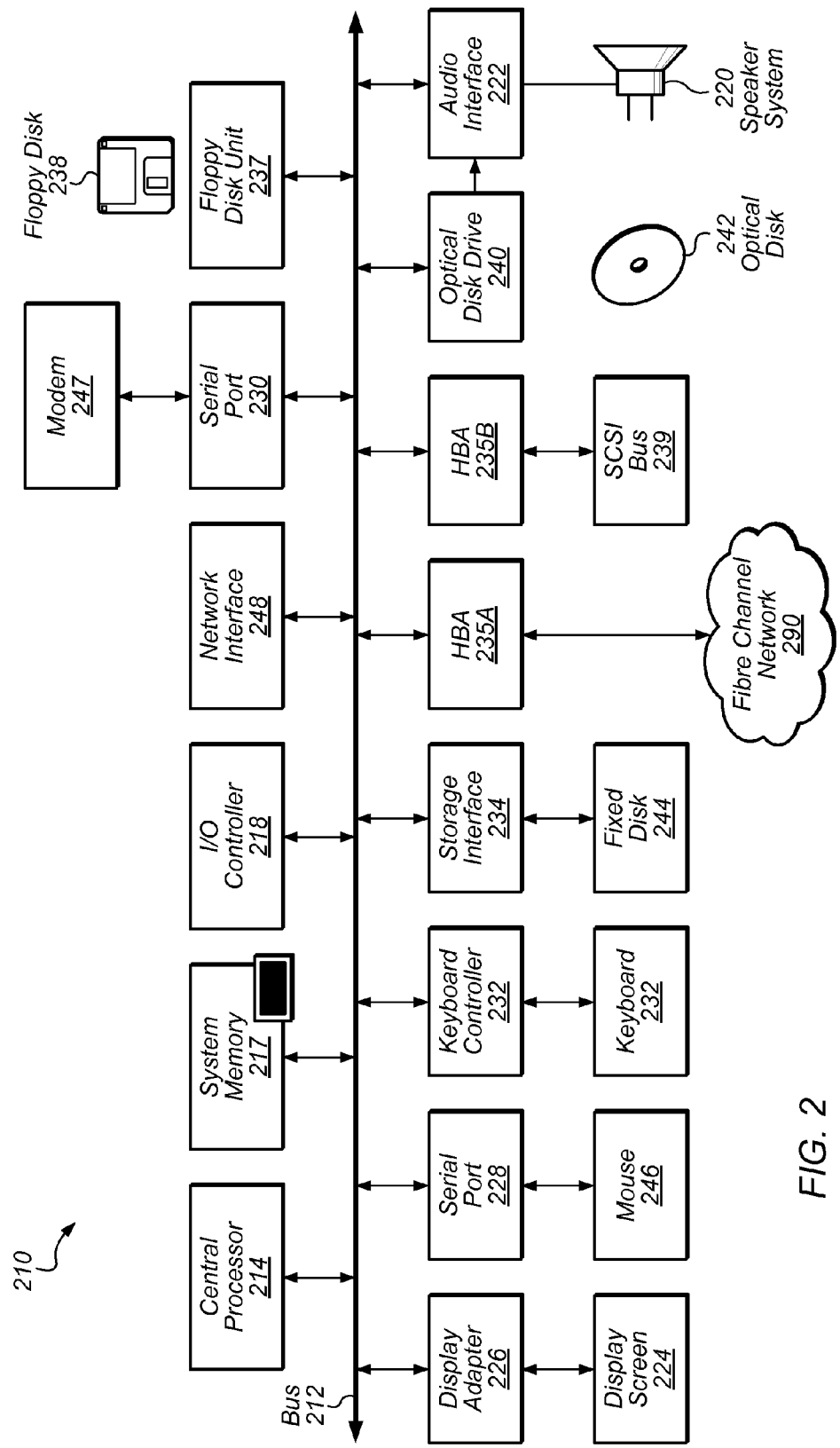
FIG. 2 is a block diagram illustrating a computer system according to one embodiment.

Turning to FIG. 1, a block diagram is shown depicting a network architecture 100 in which client systems 110, 120 and 130, as well as storage servers 140A and 140B (any of which can be implemented using computer system 210, shown in FIG. 2), are coupled to a network 150. Storage server 140A is further depicted as having storage devices 160A(1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150.

With reference to computer system 210, modem 247, network interface 248 or some other method can be used to provide connectivity from each of client computer systems 110, 120 and 130 to network 150. Client systems 110, 120 and 130 are able to access information on storage server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N). Additionally, a user may be able to request that certain tasks be performed using a client system 110, 120, or 130. For example, in one embodiment, a user may desire that an incremental backup of a client system be taken; in another embodiment, a user may desire that a synthetic full backup be generated for a client system. The user may be able to create such data backup requests using a client system 110, 120, or 130. Backup operations (such as incremental and synthetic full backups, among other backup operations) may likewise be requested via a server (e.g., server 140A or server 140B). In some embodiments backup operations (and/or backup operation requests) may be performed automatically, e.g., without direct user input specifying that the backup operations be performed. For example, embodiments are contemplated in which backup operations are performed according to a predetermined schedule.

Various embodiments of the present disclosure may be implemented by either a client computer system (such as one or clients 110, 120, 130) or a server computer system (such as one of servers 140A, 140B). In particular, some embodiments relate to a distributed method for constructing a synthetic full backup, in which at least some of the information used to construct a synthetic full backup may be generated and stored on the client system for which the synthetic full backup is to be constructed.

It should be noted that although FIG. 1 illustrates an exemplary network architecture that could be used to implement the present disclosure, the computer system(s) implementing the present disclosure may be connected in any of various ways. For example, FIG. 1 depicts the use of a network such as the Internet for exchanging data, but the present disclosure is not limited to the Internet or any particular network-based environment. It will also be noted that in some embodiments, part or all of the present disclosure could be implemented as part of a cloud computing environment.

FIG. 2 depicts a block diagram of a computer system 210 suitable for implementing the present disclosure. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., tape drives, tape libraries, disk arrays, document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
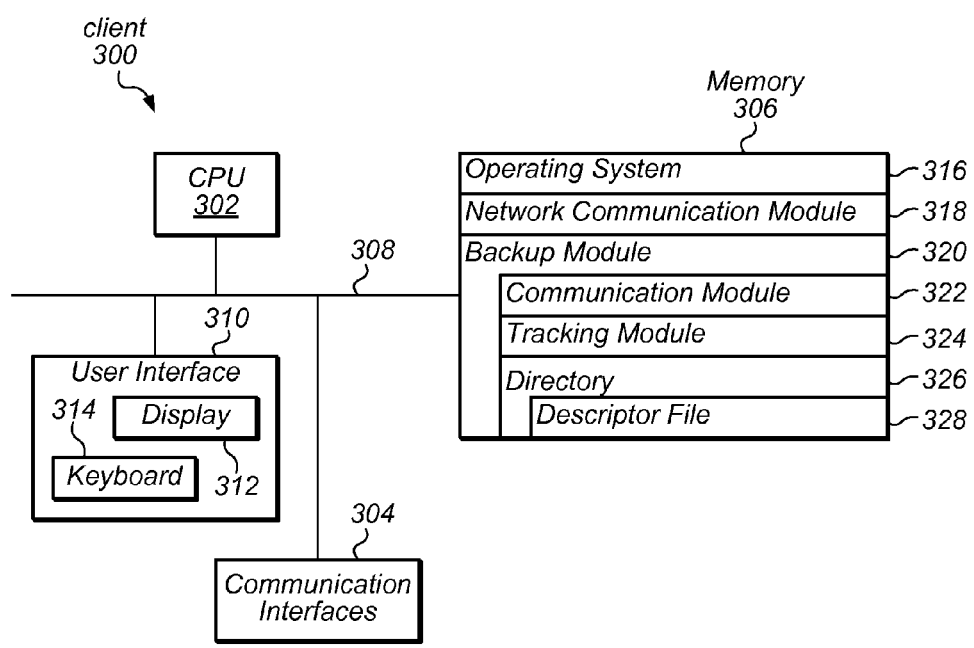
FIG. 3 is a block diagram illustrating one embodiment of a representative computer system configured to store information for use in generating a synthetic full backup.

FIG. 3 is a block diagram illustrating one embodiment of a computer system implementing the present disclosure, such as any of the client computer systems shown in FIG. 1.

Although FIG. 3 represents one embodiment, it will be recognized that any number of variations thereof are also possible.

The client 300 typically includes one or more processing units (CPUs) 302, one or more network or other communications interfaces 304, memory 306, and one or more communication buses 308 for interconnecting these components. The client 300 may optionally include a user interface 310, including a display 312 and a keyboard 314. The memory 306 may include high speed random access memory and may also include non-volatile memory, such as one or more magnetic or optical storage disks. The memory 306 may include mass storage that is remotely located from CPUs 302. The memory 306 may store the following elements, or a subset or superset of such elements:

an operating system 316 that includes procedures for handling various basic system services and for performing hardware dependent tasks;

a network communication module (or instructions) 318 that is used for connecting the client 300 to other computers via the one or more communications interfaces 304 (wired or wireless), such as the Internet, other wide area networks, local area networks, metropolitan area networks, and so on; and a backup module 320 for performing backups (e.g., incremental backups) on the client 300 and for tracking and storing information that can be used to construct a synthetic full backup.

In some embodiments, the backup module 320 may include the following elements, or a subset or superset of such elements:

a communication module 322 for receiving and sending information (e.g., requests to perform tasks or other information);

a tracking module 324 for tracking information that can be used to construct a synthetic full backup; and one or more directories 326, each storing one or more files such as a descriptor file 328.

It should be noted that in various embodiments, some or all of the modules above may be combined together or separated into further modules.

Figure 4:
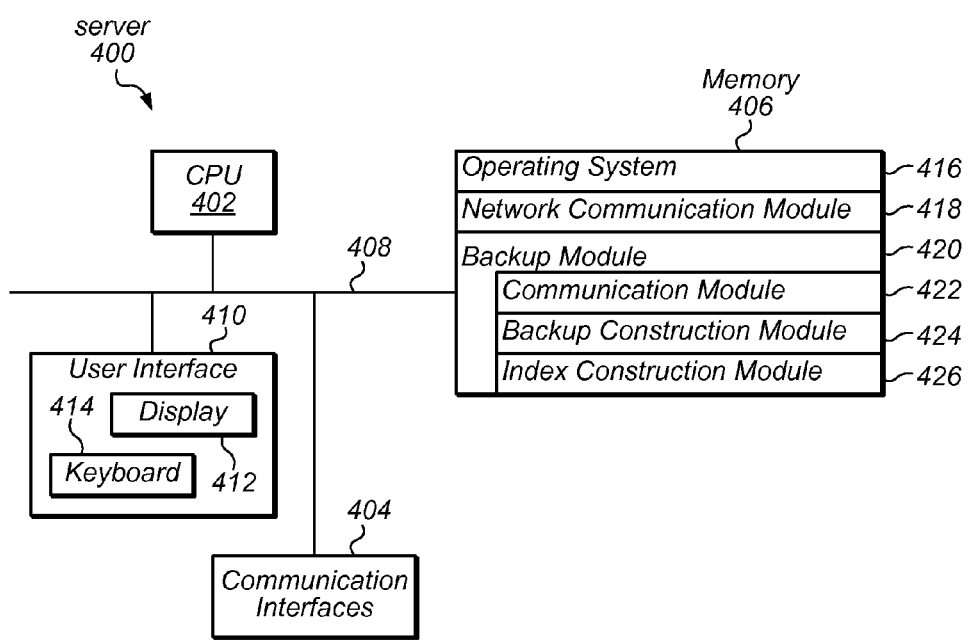
FIG. 4 is a block diagram illustrating one embodiment of a representative computer system configured to generate a synthetic full backup.

FIG. 4 is a block diagram illustrating one embodiment of a computer system implementing the present disclosure, such as any of the server computer systems shown in FIG. 1. Although FIG. 4 represents one embodiment, it will be recognized that any number of variations thereof are also possible.

Much like the client 300 shown in FIG. 3, the server 400 typically includes one or more processing units (CPUs) 402, one or more network or other communications interfaces 404, memory 406, and one or more communication buses 408 for interconnecting these components. The server 400 may optionally include a user interface 410, including a display 412 and a keyboard 414. The memory 406 may include high speed random access memory and may also include non-volatile memory, such as one or more magnetic or optical storage disks. The memory 406 may include mass storage that is remotely located from CPUs 402. The memory 406 may store the following elements, or a subset or superset of such elements:

an operating system 416 that includes procedures for handling various basic system services and for performing hardware dependent tasks;

a network communication module (or instructions) 418 that is used for connecting the server 400 to other computers via the one or more communications interfaces 404 (wired or wireless), such as the Internet, other wide area networks, local area networks, metropolitan area networks, and so on; and a backup module 420.

In some embodiments, the backup module 420 may include the following elements, or a subset or superset of such elements:

a communication module 422 for receiving and sending information;

a backup construction module 424 for constructing a synthetic full backup; and an index construction module 426 for constructing an index for a synthetic full backup.

It should be noted that in various embodiments, some or all of the modules above may be combined together or separated into further modules.

Figure 5:
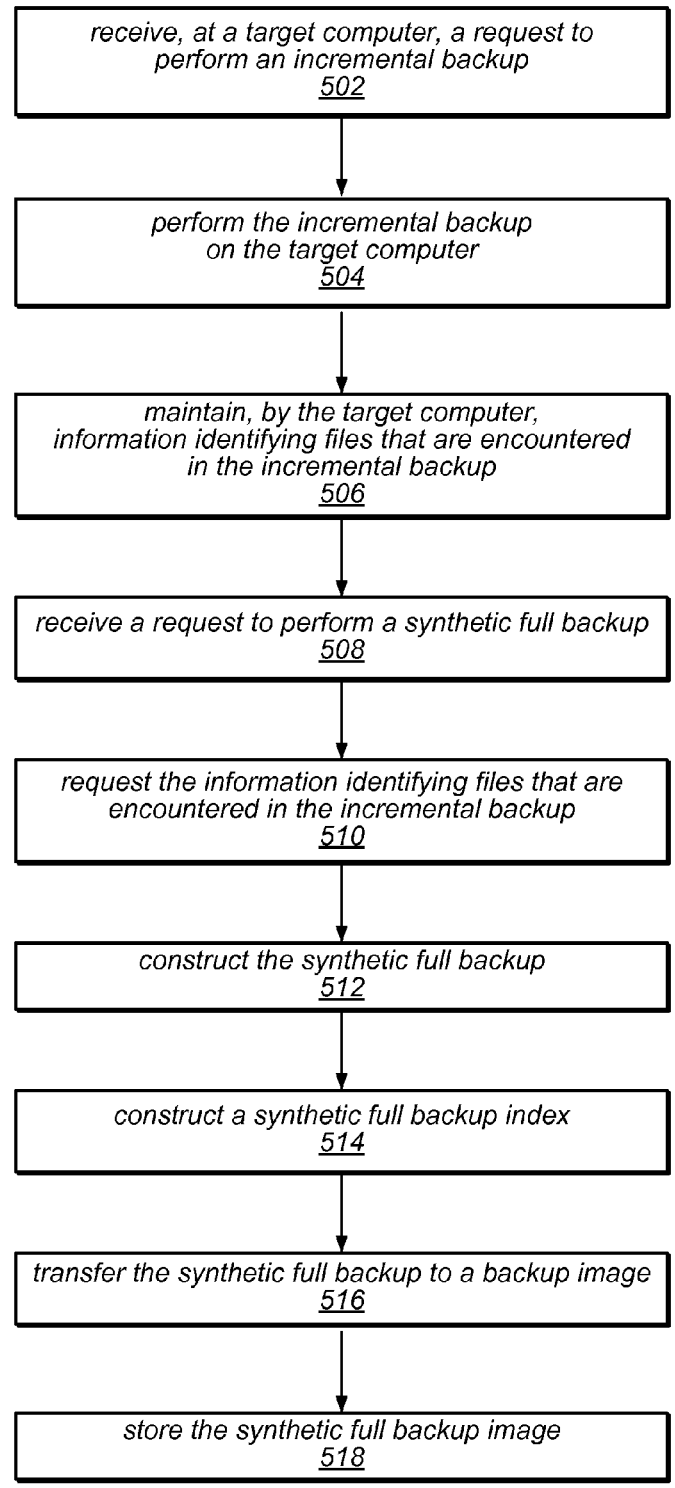
FIG. 5 is a flow diagram illustrating one embodiment of a method for generating a synthetic full backup.

Turning now to FIG. 5, a method is disclosed for constructing a synthetic full backup. The method may substantially address many of the problems presented by current full and incremental backup systems. More specifically, since performing a series of incremental backups typically leads to data being stored in disparate locations, management of the data tends to become more complicated over time. Restores will also take longer if information needs to be collected from numerous different locations, as will be typical as a series of incremental backups becomes longer and longer. Because of this, it is desirable to periodically have full backups. However, since full backups typically consume significant network bandwidth and cut into the time available to perform incremental backups, it is desirable to be able to construct, from incremental backups, backup images that are indistinguishable from actual full backups. These constructed backups are referred to as synthetic full backups. Since these only require data already collected, they can be made at times other than when incremental backups are being taken.

A further advantage of the method for constructing a synthetic full backup as described herein is that the method may be performed in a distributed manner. For example, in some enterprise systems which utilize centralized servers and various client endpoints, the distribution of processing and network bandwidth may tend to be disproportionately skewed towards the centralized servers. It may in such cases be desirable to find ways to distribute workload more efficiently throughout the system. Many of the embodiments described below may achieve this, for example, by delegating some of the work of constructing a synthetic full backup to the (e.g., endpoint) computer system for which the synthetic full backup is being constructed.

The method may be implemented by one or more computer systems (e.g., any of the client and server computer systems shown in various of the previous Figures). In some embodiments, the method may be a distributed method, e.g., parts of the method may be implemented by different computer systems. Each computer system may typically include, for example, one or more processors, and a computer readable storage medium which stores program instructions executable by the one or more processors to perform part or all of the method. Each computer system may also include other hardware and/or components, for example, any of the hardware and components shown in and described with respect to FIG. 2. Other embodiments include computer readable storage media (e.g., articles of manufacture) which store program instructions executable to implement part or all of the method according to the embodiments described herein. According to some embodiments, various of the steps may be performed by various of the modules shown in FIGS. 3 and 4, which may be referred to in the description below.

It should be noted that although the description below may set forth steps as being performed in a particular order, various of the steps may be performed in a different order, repeated, or omitted, as desired. One or more additional steps may also be performed, in some embodiments. The method may be performed as described below.

In 502, a request to perform an incremental backup may be received at a target computer. In some embodiments, the request may be received by the communications sub-module 322 in backup module 320 on client 300. The request may be based on a user request to perform the incremental backup, or the request may be automatically generated, e.g., based on a schedule or some triggering event. The request may have been generated on the target computer (e.g., client 300), or may have been remotely generated, e.g., on a server (such as server 400) or other computer system.

In 504, the incremental backup may be performed on the target computer. In some embodiments, the incremental backup may be performed on the target computer by the backup module 320 on client 300. The incremental backup may back up (e.g., may copies of) any files on the target computer system which have been modified since a last (either incremental or full) backup. In other words, the incremental backup may be a differential incremental backup. Embodiments are also contemplated in which the incremental backup may be a cumulative incremental backup, e.g., in which any files on the target computer which have been modified since a last full backup are backed up, regardless of any previous incremental backups since the last full backup. In some embodiments, the files backed up as part of the incremental backup may be stored as a backup image on a storage device, such as any of storage devices 160A(1)-160A(N), 160B(1)-160B(N), 180(1)-180(N).

In 506, information identifying files that are encountered in the incremental backup may be maintained by the target computer. In some embodiments, the information may be maintained by tracking sub-module 324 of backup module 320 on client 300. The information may be configured to be used to construct a synthetic full backup.

In some embodiments, maintaining the information may include storing file identifiers into a data structure on the target computer. The file identifiers may correspond to files that are encountered in the incremental backup. In some embodiments, the file identifiers may be those provided by an operating system on the target computer; for example, embodiments are contemplated in which i-node numbers (e.g., on Unix-type systems) and/or file ids (e.g., on Windows systems) may be used as the file identifiers. Each file identifier may uniquely identify a file within a file system or volume. By using commonly provided file identifiers, it may be possible to efficiently track the files encountered in the incremental backup as a list of binary identifier values stored in network ordering. An advantage of this is that each binary file identifier value may be of a fixed size, which may allow the data to be more easily manipulated.

In some embodiments, the information (e.g., the file identifiers for each file encountered) may be recorded only for a first backup. In such embodiments, the information may be maintained in subsequent backups, e.g., if a file is deleted or moved in between backups, so that the information remains current and continues to be usable for creating a synthetic full backup. Alternatively, the information may be recorded more frequently (e.g, for each backup) if desired.

According to some embodiments, a directory (such as directory 326 on client 300) may be created for each file system and/or volume encountered. In each directory a list (e.g., a file, such as descriptor file 328 on client 300, including a list) of binary file identifiers for files in that file system/volume may be created and maintained. For example, there may be one entry for each file encountered while performing a backup, and the identifiers may be listed in network byte order. By maintaining separate directories and files for each file system/volume, the uniqueness of each file identifier may be preserved; in other words, since the file identifiers may only guarantee uniqueness within a given file system or volume, it may be important to segregate file identifiers for files within different file systems and volumes, so that no two file identifiers are duplicated.

It should also be noted that, as part of the incremental backup, the file identifier for each file may be backed up as part of each file's backup image. These identifiers may be part of the normal file information.

In 508, a request to perform a synthetic full backup may be received. More specifically, in some embodiments, the request may be to perform a synthetic full backup of the target computer. In some embodiments, the request may be received by communication sub-module 422 of backup module 420 on server 400. The request may be based on a user request to perform the synthetic full backup, or the request may be automatically generated, e.g., based on a schedule or some triggering event. For example, in some embodiments, a synthetic full backup may be generated after each incremental backup. The request may have been generated on the target computer (e.g., client 300), or may have been generated on a server (such as server 400) or other computer system.

In 510, the information identifying files that are encountered in the incremental backup may be requested. In some embodiments, the information may be requested by the communication sub-module 422 of backup module 420 on server 400. The request may be sent to the target computer, e.g., to communication sub-module 322 of backup module 320 on client 300. The target computer may then convey the information back to the computer system making the request.

In 512, the synthetic full backup may be constructed. In some embodiments, the synthetic full backup may be constructed by the backup construction sub-module 424 of backup module 420 on server 400. In some embodiments, constructing the synthetic full backup may include constructing a restore, which may subsequently (e.g., in step 516 described below) be transferred to a backup image. The restore may include all of the latest backups for each file identified by the information, e.g., for each file in the list(s) of file identifiers. In other words, constructing the synthetic full backup may include combining files from various incremental and/or full backup images as if preparing a restore image to be restored to a computer system.

In 514, a synthetic full backup index may be constructed for the synthetic full backup. In some embodiments, the synthetic full backup index may be constructed by the index construction sub-module 426 of backup module 420 on server 400. Much like the synthetic full backup itself, the synthetic full backup index may be constructed from records from old indexes (e.g., for old incremental or full backups) for each file selected (e.g., from the old incremental or full backups) that are to be part of the new synthetic full backup.

In 516, the synthetic full backup may be transferred to a backup image. According to some embodiments, the synthetic full backup may be transferred by the communication sub-module 422 of backup module 420 on server 400. As noted above, the synthetic full backup may be constructed as if it were a restore to be performed to a computer system. However, instead of sending the restore to a computer system as would be done for a normal restore, the restore stream may be redirected to a backup image. For example, the synthetic full backup might be stored as a backup image on a storage device, such as any of storage devices 160A(1)-160A(N), 160B(1)-160B(N), 180(1)-180(N) shown in FIG. 1.

In 518, the synthetic full backup index may be stored. According to some embodiments, the synthetic full backup index may be stored by the communication sub-module 422 of backup module 420 on server 400. For example, the synthetic full backup index may also be stored to a storage device, such as any of storage devices 160A(1)-160A(N), 160B(1)-160B(N), 180(1)-180(N) shown in FIG. 1. Alternatively, or in addition, the synthetic full backup index may be stored in memory on the computer system that constructed the synthetic full backup (e.g., the server 400) or any other computer system (such as any of the computer systems in FIG. 1), as desired.

The approach presented herein provides a relatively simple, non-data intensive solution to constructing synthetic backups. One of the significant advantages provided by this approach is the distributed aspect of the method, where the information used to construct the synthetic full backup (e.g., descriptor file(s) including file identifiers for the files on the target computer) is both constructed and maintained on the target computer itself, as opposed to a centralized server or other computer.

Another significant benefit of the method, in some embodiments, may arise from the methodology used for creating the synthetic full backup, where the synthetic full backup may be constructed as if it is a restore operation. This may allow for implementations in which existing restore systems can be leveraged to provide the functionality described herein, rather than requiring a totally new synthetic full backup operation to be designed.

An additional point of differentiation between the present disclosure and conventional methods may include the use of unique file identifiers in creating a list of files to be used in constructing the synthetic full backup. Because the file identifiers uniquely identify a file within a file system or volume, this may eliminate a need to sort file information which exists in some systems which utilize filenames or other non-unique file identifiers to track the files on a given system.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A distributed method for generating a synthetic full backup, the method comprising:
   receiving, at a target computer, a request to perform an incremental backup of the target computer;
   performing, by the target computer, the incremental backup on the target computer in response to the request;
   maintaining, by the target computer, information identifying the files that are encountered in the incremental backup, wherein the information is configured to be used to construct a synthetic full backup, wherein the information is stored on the target computer;
   receiving, at a backup server, a request to perform a synthetic full backup of the target computer;
   requesting, by the backup server, the information from the target computer;
   receiving, at the backup server, the information from the target computer;
   constructing, by the backup server, the synthetic full backup using the information from the target computer;
   constructing, by the backup server, a synthetic full backup index for the synthetic full backup using records from old indexes for each file in the synthetic full backup;
   transferring the synthetic full backup to a backup image;
   storing the synthetic full backup index.

2. The method of claim 1,
   wherein said constructing the synthetic full backup comprises combining a plurality of incremental and/or full backup images to create the synthetic full backup.

3. The method of claim 2,
   wherein said maintaining information comprises storing file identifiers into a data structure on the target computer corresponding to files that are encountered in the incremental backup;
   wherein the plurality of incremental and/or full backup images used to construct the synthetic full backup comprise latest backups for the files indicated by the file identifiers.

4. The method of claim 1,
   wherein said maintaining information comprises storing file identifiers into a data structure on the target computer corresponding to files that are encountered in the incremental backup.

5. The method of claim 4,
   wherein storing the file identifiers comprises storing a file comprising a stack of file identifiers for files that are encountered in the incremental backup.

6. The method of claim 4, further comprising:
   creating, at the target computer, a separate directory for each file system and each volume that is encountered in the incremental backup;
   wherein the file identifiers stored for files that are encountered in the incremental backup are stored in a directory according to the file system or volume in which the corresponding files are located.

7. The method of claim 4,
   wherein each file identifier uniquely identifies a file within a file system or volume.

8. A computer readable storage medium comprising program instructions for storing information for use in generating a synthetic full backup, wherein the program instructions are executable to:
   receive, at a target computer, a request to perform, by the target computer, an incremental backup of the target computer;
   perform the incremental backup on the target computer in response to the request;
   store file identifiers for files that are encountered in the incremental backup, wherein the file identifiers are stored in a data structure on the target computer, wherein the file identifiers are configured to be used to construct a synthetic full backup.

9. The computer readable storage medium of claim 8, wherein the program instructions are further executable to:
   receive a request for file information for use in constructing a synthetic full backup;
   convey the file identifiers, wherein the file identifiers are used to construct a synthetic full backup.

10. The computer readable storage medium of claim 8, wherein the synthetic full backup is constructed by combining a plurality of incremental and/or full backup images to create the synthetic full backup.

11. The computer readable storage medium of claim 10, wherein the plurality of incremental and/or full backup images used to construct the synthetic full backup comprise latest backups for the files indicated by the file identifiers.

12. The computer readable storage medium of claim 8, wherein storing the file identifiers comprises storing a file comprising a stack of file identifiers for files that are encountered in the incremental backup.

13. The computer readable storage medium of claim 8, wherein the program instructions are further executable to
   create, at the target computer, a separate directory for each file system and each volume that is encountered in the incremental backup;
   wherein the file identifiers stored for files that are encountered in the incremental backup are stored in a directory according to the file system or volume in which the corresponding files are located.

14. The computer readable storage medium of claim 8, wherein each file identifier uniquely identifies a file within a file system or volume.

15. A computer readable storage medium comprising program instructions for generating a synthetic full backup, wherein the program instructions are executable to:
   receive a request to perform a synthetic full backup of a target computer;
   request file information from the target computer, wherein the file information comprises file identifiers stored in a data structure on the target computer, wherein the file identifiers comprise a representation of a full backup;
   receive the file information from the target computer;
   construct the synthetic full backup, wherein the synthetic full backup comprises latest backups for the files indicated by the file identifiers;
   construct a synthetic full backup index for the synthetic full backup using records from old indexes for each file indicated by the file identifiers;
   transfer the synthetic full backup to a backup image;
   store the synthetic full backup index.

16. The computer readable storage medium of claim 15, wherein, in constructing the synthetic full backup, the program instructions are further executable to combine a plurality of incremental and/or full backup images to create the synthetic full backup.

17. The computer readable storage medium of claim 16, wherein the plurality of incremental and/or full backup images used to construct the synthetic full backup comprise latest backups for the files indicated by the file identifiers.

18. The computer readable storage medium of claim 15, wherein the file identifiers are stored at the target computer in a file comprising a stack of file identifiers for files that are encountered in the incremental backup.

19. The computer readable storage medium of claim 15, wherein a separate directory is stored at the target computer for each file system and each volume that is encountered in the incremental backup;
   wherein the file identifiers stored for files that are encountered in the incremental backup are stored in a directory according to the file system or volume in which the corresponding files are located.

20. The computer readable storage medium of claim 15, wherein each file identifier uniquely identifies a file within a file system or volume.

* * * * *